United States Patent [19]

Brasfield et al.

[11] 4,235,512
[45] Nov. 25, 1980

[54] RETRO-REFLECTIVE ASSEMBLY AND METHOD OF MANUFACTURING SAME

[75] Inventors: Steven H. Brasfield, Jackson, Miss.; Paul Shalita, Roslyn Heights, N.Y.

[73] Assignee: Ferro Corporation, Cleveland, Ohio

[21] Appl. No.: 36,435

[22] Filed: May 7, 1979

[51] Int. Cl.³ .............................................. G02B 5/128
[52] U.S. Cl. ...................................... 350/105; 350/97
[58] Field of Search ...................... 350/105, 101–104, 350/97–100; 118/213, 301, 211; 427/144, 207 R; 404/9.6

[56] References Cited

U.S. PATENT DOCUMENTS

| | | | |
|---|---|---|---|
| 2,948,191 | 8/1960 | Hodgeson et al. | 350/105 |
| 3,154,872 | 11/1964 | Nordgren | 350/105 |
| 3,190,178 | 6/1965 | McKenzie | 350/105 |
| 3,877,786 | 4/1975 | Booras et al. | 350/105 |
| 3,975,083 | 8/1976 | Rowland | 350/103 |
| 4,025,159 | 5/1977 | McGrath | 350/105 |
| 4,123,140 | 10/1978 | Ryan et al. | 350/105 |
| 8,635,194 | 1/1972 | Prior | 118/301 |

Primary Examiner—John K. Corbin
Assistant Examiner—B. W. de los Reyes
Attorney, Agent, or Firm—Wilson, Fraser, Barker & Clemens

[57] ABSTRACT

In a retro-reflective assembly comprising a base member in whose surface is contained a contiguous layer of exposed retro-reflective elements and a plurality of support elements upstanding from said base member, this invention contemplates forming such support elements from viscous adhesive material and applying the adhesive material in a precise pattern to the base member by utilization of screen printing techniques. The encapsulating transparent film may then be applied to the sub-assembly by adhesive engagement with the top surfaces of the adhesive supports, eliminating the need for the application of substantial heat and pressure heretofore required.

8 Claims, 3 Drawing Figures

RETRO-REFLECTIVE ASSEMBLY AND METHOD OF MANUFACTURING SAME

BACKGROUND OF THE INVENTION

There are many prior patents relating to retro-reflective assemblies. Typical of such patents are U.S. Pat No. 2,948,191 to Hodgeson, Jr. et al; U.S. Pat. No. 3,190,178 to McKenzie; U.S. Pat. No. 4,123,140 to Ryan et al and U.S. Pat. No. 4,025,159 to McGrath. The basic structure employed in the prior art comprises a base member having a contiguous layer of exposed retro-reflective elements contained in the surface thereof, with or without a network of upstanding supports, generally without interconnected linear ridges, being a part of the base member but forming discrete divided areas of retro-reflective glass beads at the time the transparent encapsulating film is applied to the base member using heat and embossing pressure acting on the thermo-plastic material in which the retro-reflective elements are held to effect a thermo-plastic bond with the transparent encapsulating film; this bond being sensitive to the temperature used in subsequent processing and use. The completion of the encapsulating step by the application of a transparent thermo-plastic material has necessarily dictated the employment of heat and pressure to effect the bonding. It is well known that there are a number of desirable transparent thermo-setting or thermo-plastic materials which could be utilized as the encapsulating element of a retro-reflective assembly if heat and pressure bonding were not essential, and, more importantly, it is desirable that the assembly of the transparent sheet be accomplished without the application of substantial heat and pressure because this invariably results in a ripple or wave effect being imparted to the outer surface. The ripple effect makes the outer surface far more receptive to accumulating deposits of dust or dirt, and more difficult to clean.

OBJECTS OF THE INVENTION

Accordingly, it is an object of this invention to provide an improved retro-reflective assembly and a method of manufacturing same.

A particular object of this invention is to provide a retro-reflective assembly wherein the support posts or ridges by which the outer transparent sheet is bonded to the assembly is formed from adhesive material which is precisely deposited on the base sheet by screen printing techniques.

Another object of this invention is to provide a more flexible retro-reflective assembly that is not as sensitive to the normal temperatures encountered in processing and use and where heat is not required to relax the set or curl which inherently exists in thermo-plastic material supplied from a roll.

Another particular object of this invention is to provide an improved retro-reflective assembly wherein the outer encapsulating transparent sheet is formed from an organic thermo-setting material and is assembled to the matrix or base member without the application of any substantial heat or pressure, thus maintaining the planarity of the transparent sheet.

Other objects and advantages of this invention will be apparent to those skilled in the art from the following detailed description, taken in conjunction with the annexed sheets of drawings.

DESCRIPTION OF THE PREFERRED EMBODIMENT OF THE INVENTION

Figure 2:
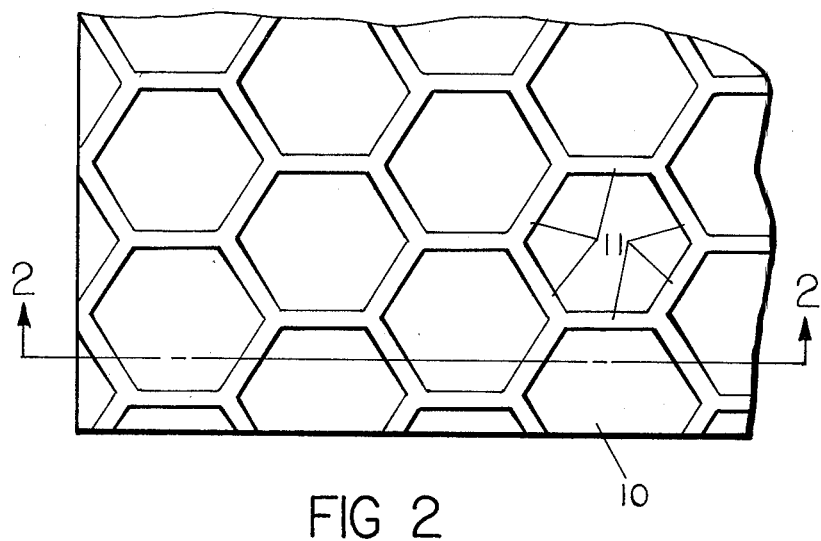
FIG. 2 is a plan view of the assembly of FIG. 1 prior to the application thereto of the transparent encapsulating sheet.
Figure 3:
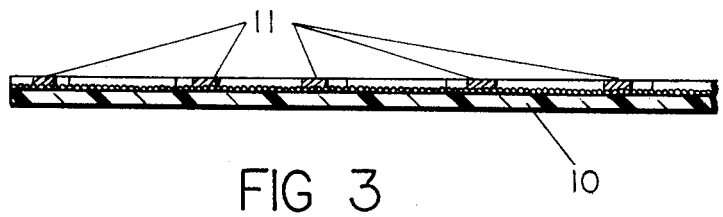
FIG. 3 is a sectional view taken on the plane 2—2 of FIG. 2.
Figure 1:
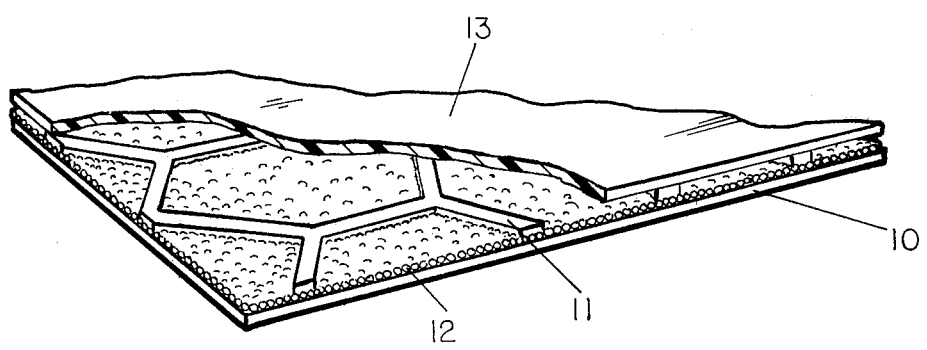
FIG. 1 is a perspective view, with portions broken away for clarity, of a retro-reflective assembly constructed in accordance with the invention.

Referring to FIG. 1, there is shown a completed retro-reflective assembly comprising a base member 10, having a contiguous layer of exposed retro-reflective elements or beads 12 contained in the surface, each element 12 being partially coated with or in contact with a reflecting material (not shown). Secured to said base member 10 in upstanding relationship is a plurality of supports 11 which are of equal height and such height is approximately equal to, but not less than, the height of the exposed retro-reflective beads 12 which appear in a continuous array intermediate the supports 11. The characteristics of the retro-reflective beads 12 as well known in the art and the methods of securing such beads within the base member 10 so that they form a contiguous layer exposed to the viewed side of the assembly are likewise well disclosed in the art and form no part of this invention.

In accordance with this invention, the supports 11, which in the illustrated embodiment are shown as a plurality of interconnected ridges defining hexagonal spaces therebetween, are formed from an adhesive material which is capable of being deposited on the upper surface of base member 10 by a screen printing technique. The material selected for the support members 11 should preferably have sufficient viscosity to be self-sustaining configuration after being deposited on base member 10, either at ambient temperatures or with the application of minimal amounts of heat thereto. The utilization of screen printing techniques permits the deposition of the ridges 11 in very precise patterns providing a high degree of accuracy of not only the width and location of the ridges 11, but also their height. Such accuracy of deposition is characteristic of the screen printing technique utilizing screens produced by known electro-forming techniques.

A relative thin transparent cover sheet or film 13 is then applied to the sub-assembly and bonded thereto by the adhesive action of the top surface of the adhesive ridges 11. Preferably such bonding is effected with a minimal application of heat and/or pressure, and certainly not sufficient heat or pressure to cause any deformation of the transparent encapsulating film 13. The employment of an adhesive to form the supporting ridges 11 permits the selection of either a thermo-plastic or thermo-setting transparent material for the bonding sheet.

Accordingly, many resinous materials may be used for this purpose. Typical of such materials are the following:

| | |
|---|---|
| Polyamids | Polyacrylates |
| Polyimids | Styrene-acrylonitrile copolymers |
| Polyvinyl chloride | Polyesters |

-continued

| Polyvinyl floride | Urethane-acrylate copolymers |

Appropriate resinous adhesives are any of the following:

| Polyesters | Polyurethanes |
| Polyacrylates | Epoxy |
| Copolymers of the above | |

A preferred example comprises a base member of polyurethane acrylate, in whose surface is contained the exposed retro-reflective elements 12 partially coated with or in contact with a reflecting material. The retro-reflective elements comprise glass beads in the size range of 0.0005 inch in diameter to 0.0035 inch in diameter. Preferred size is 0.0010 to 0.0025 inch in diameter and having a reflective coating of aluminum, silver or other metals used in known metalizing processes. The adhesive material comprises 100 parts of a polyester adhesive known as DuPont 49001, 25 parts of a white pigment such as titania, 10 parts of a conventional curing agent such as a free-radical catalyst like benzoyl peroxide, and 75–125 parts of a solvent blend comprising equal portions of toluene and cyclohexanane which is applied by screen printing at a temperature of about 21° C. which results in a viscosity of approximately 5,000 to 35,000 cps. The transparent cover sheet is formed of extruded polyacrylic resin and applied at a temperature of about 60–66° C. while the top surface of the adhesive supports is still tacky. A minimal pressure sufficient to insure contact of the sheet 13 with the supports 11, is utilized in the sheet assembly operation. Conversely, the adhesive can be applied to the transparent cover sheet and laminated to the base.

While a grid-like pattern of the supports 11 has been illustrated in the drawings, it will be apparent to those skilled in the art that the employment of the screen printing application technique will permit any desired pattern to be employed. The main criteria is that the supports 11 are spaced across the face of the bottom member 10 and are in sufficient number as to provide adequate structural support for the later applied transparent encapsulating sheet 13, and also forms discrete sealed retro-reflective cells.

While the preferred embodiment utilizes the screen printing technique to lay down the network of supports 11, it will be readily apparent that other methods may be used to establish said network. For example, more conventional printing techniques, involving an embossed roll could be employed.

Other modifications of this invention will be apparent to those skilled in the art, and it is intended that the scope of the invention be determined solely by the following claims.

We claim:

1. In a process for forming an encapsulated retro-reflective assembly having a supporting open network disposed between a base member adapted to contain retro-reflective elements and an overlying encapsulating film, the improvement of forming said supporting open network in the absence of substantial heat or pressure, said process comprising printing an adhesive material onto said base member to form a plurality of upstanding supports thereon, said supports constituting a precise pattern of at least equal height throughout and having a greater height than such retro-reflective elements, and adhering an encapsulating film to said upstanding supports, said film being substantially free of ripple or wave effects due to said precise pattern of said upstanding supports, and said absence of substantial heat or pressure in forming said upstanding supports enabling a wider choice of materials for said supports or encapsulating film.

2. The process of claim 1 in which said encapsulating film comprises a resinous material selected from the group consisting of thermoplastic and thermosetting resins.

3. The process of claim 1 in which said adhesive material forming said upstanding supports comprises a resinous material selected from the group consisting of thermoplastic and thermosetting resins.

4. The process of claim 1 in which said printing is screen printing.

5. The process of claim 1 in which said retro-reflective elements are beads.

6. A process for forming an encapsulated retro-reflective assembly having a supporting open network disposed between a base member, adapted to contain retro-reflective elements, and an overlying encapsulated film, and containing an improved supporting network, said process comprising:
 (a) screen printing a resinous material in the absence of substantial heat or pressure onto a base member having retro-reflective elements,
 (b) forming by said screen printing from said material a self-sustaining network configuration of interconnected supports, said supports having a relatively high degree of uniformity in width, location, and height due to said screen printing application and having a height greater than said retro-reflective elements, and
 (c) applying and adhering an encapsulating film to said network configuration in the absence of sufficient heat or pressure to cause any deformation of said film and thereby maintain its planarity.

7. An encapsulated retro-reflective assembly comprising a base member having retro-reflective elements, a precisely formed, supporting open network printed on said base member defining a plurality of upstanding supports having a height greater than said retro-reflective elements, and an encapsulating film adhered to said upstanding supports being substantially plane and free of ripples and the like due to said precise printed formation of said upstanding supports, whereby due to the absence of substantial heat or pressure in the formation of the assembly, said upstanding supports or encapsulating film can include a wider variety of materials than formerly possible.

8. The encapsulated retro-reflective assembly of claim 7 in which said upstanding supports and encapsulating film comprise a resinous material selected from the group consisting of thermoplastic and thermosetting resins.

* * * * *